United States Patent
Morishita

(10) Patent No.: US 7,098,618 B2
(45) Date of Patent: Aug. 29, 2006

(54) RAIN DETECTION SYSTEM AND METHOD OF CONTROLLING THE SAME

(75) Inventor: Taiji Morishita, Kariya (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/165,336

(22) Filed: Jun. 24, 2005

(65) Prior Publication Data

US 2005/0285557 A1    Dec. 29, 2005

(30) Foreign Application Priority Data

Jun. 24, 2004   (JP)   ............................. 2004-186827

(51) Int. Cl.
*H02P 1/04*   (2006.01)

(52) U.S. Cl. ................. 318/444; 318/443; 318/440; 318/483

(58) Field of Classification Search ............... 318/444, 318/DIG. 2, 443, 480, 483; 15/250.12; 324/665
See application file for complete search history.

(56) References Cited

U.S. PATENT DOCUMENTS

| | | | |
|---|---|---|---|
| 5,453,670 A | | 9/1995 | Schaefer |
| 6,118,383 A | | 9/2000 | Hegyi |
| 6,373,263 B1 | * | 4/2002 | Netzer ......................... 324/665 |
| 6,657,410 B1 | | 12/2003 | Berger et al. |
| 2003/0183752 A1 | * | 10/2003 | Kobayashi et al. ....... 250/222.2 |
| 2004/0178760 A1 | * | 9/2004 | Kobayashi et al. .......... 318/483 |

FOREIGN PATENT DOCUMENTS

JP       2002-283968       10/2002

* cited by examiner

*Primary Examiner*—Karen Masih
(74) *Attorney, Agent, or Firm*—Nixon & Vanderhye P.C.

(57) ABSTRACT

A rain detection system generates an operation signal for operating a wiper system on a window based on a detected window condition. The rain detection system includes a detection mechanism for intermittently detecting an amount of liquid on the window, a calculation mechanism for calculating an increase rate of the amount of the liquid detected in a detection operation by the detection mechanism and a determination mechanism for determining the window condition based on the increase rate calculated by the calculation mechanism. The determination mechanism distinguishes difference between condensation on the window and rain based on the detected liquid on the window.

11 Claims, 6 Drawing Sheets

FIG. 6A   FIG. 6B   FIG. 6C
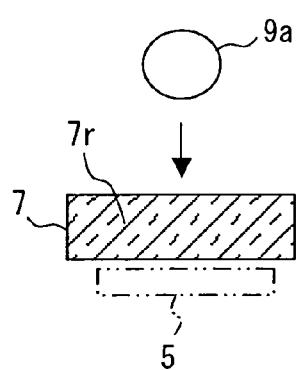 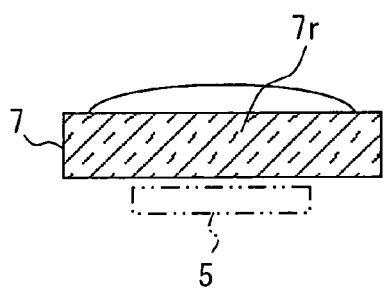 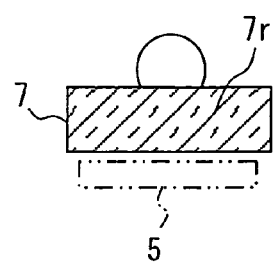
FIG. 7A   FIG. 7B   FIG. 7C
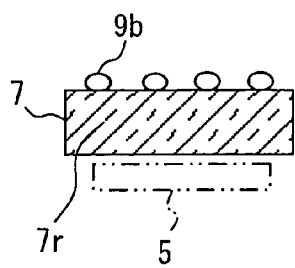 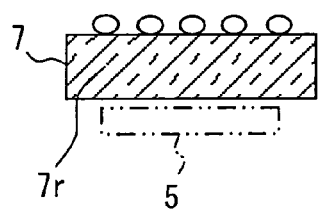 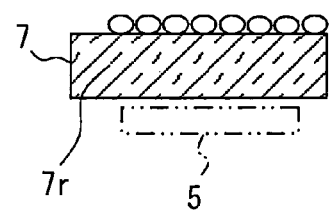

RAIN DETECTION SYSTEM AND METHOD OF CONTROLLING THE SAME

CROSS REFERENCE TO RELATED APPLICATION

This application is based on and claims the benefit of priority of Japanese Patent Application No. 2004-186827 filed on Jun. 24, 2004, the disclosure of which is incorporated herein by reference.

FIELD OF THE INVENTION

The present invention relates to a rain detection system and, more specifically to a rain detection system for controlling a wiper on a vehicle.

BACKGROUND OF THE INVENTION

A conventional wiper system disposed on a vehicle has a selection of wiping speeds for wiping operation such as an intermittent mode, a low speed mode, a high speed mode, a stop mode (i.e., an off mode) and the like. A driver of the vehicle chooses an appropriate operation mode according to an amount of rain falling on a windshield of the vehicle (refer to a Japanese Patent Document JP-A-2002-283968).

The conventional wiper system includes a rain detection system to automatically control the wiping operation. The rain detection system picks up the amount of rain in a detection area on the windshield. The detection system uses a light source (e.g., a light emitting diode (LED)) coupled with a sensor (e.g., a photo diode (PD)) to intermittently pick up a light reflected from a raindrop. The amount of rain on the windshield is determined by measuring a reflection rate of the light against the emitted amount of the light from the light source.

The reflection rate is determined, for example, by comparing a measurement of an output voltage from the PD in a rain against a measurement of an output voltage from the PD in a fine weather.

The rain detection system may include a prism for redirecting a light from the light source and to the sensor, and the prism may have a heater for preventing condensation of water in an atmosphere from forming thereon.

The conventional wiper system automatically increases a wiping speed when the amount of rain on the windshield increases. That is, the operation mode is changed from an intermittent operation mode (INT mode) or a low speed mode (LO mode) to a high speed mode (HI mode). However, the conventional wiper system mistakenly determines condensation of water on the windshield as an increased amount of rain when the vehicle enters a space such as a tunnel or the like. In this case, the conventional wiper system needlessly changes the operation mode of the wiper system to the HI mode for the sake of coping with the mistakenly detected increased amount of rain.

Further, the conventional wiper system causes discomfort of the driver in the tunnel or the like because of the needlessly changed operation mode toward a higher speed (e.g., to the HI mode). That is, a change of the operation mode, i.e., an increase of the wiping speed, is felt unnecessary to the driver in the tunnel when disturbance of visibility by the condensation on the windshield is not severe.

SUMMARY OF THE INVENTION

In view of the above-described problems, it is an object of the present invention to provide a rain detection system that measures an amount of rain appropriately by distinguishing rain from condensation of vapor on a window of a vehicle or the like.

It is another object of the present invention to prevent discomfort of a driver of the vehicle by controlling the rain detection system suitably in conditions such as a condensation disturbing driver's view or the like.

According to the present invention, the rain detection system includes a detection means for detecting an amount of water, a calculation means for calculating an increase rate of the detected amount of the water and a determination means for determining a windshield condition. The detection means provides the amount of the water to the calculation means for calculating the increase rate, and the increase rate is provided to the determination means for determining how the water accumulates on the windshield. The detection means detects the amount of water intermittently in a predetermined interval in a wiping cycle in a detection area that is swept by a wiper system. The rain detection system outputs a control signal to the wiper system for controlling an operation mode of the wiper system based on the amount of the water.

In this manner, the rain detection system of the present invention measures the amount of the water by recognizing a rain pattern more precisely than the conventional rain detection system that detects the amount of the water by measuring only an absorption rate of a light based on a difference of refraction index between an atmosphere and the water.

Further, the determination means of the rain detection system distinguishes condensation of water in an atmosphere formed on the windshield from the water of the rain based on the recognition of the rain pattern.

The determination means of the rain detection system recognizes condensation on the windshield when the increase rate of the water is greater than a predetermined positive number.

The condensation on the windshield is recognized as a constant increase of water because of evenly dispersing fine waterdrops in the atmosphere. The waterdrop of the rain behaves differently on the windshield.

The water of the rain falls down on a slant surface of the windshield as a certain mass of water that is formed by a surface tension. Therefore, the water of the rain on the windshield increases in a beginning of the rain, and typically decreases afterwards.

Each of the waterdrop of the rain changes its shape from a flat form just after landing on the windshield to a spherical form because the surface tension minimizes a surface area of the waterdrop. Therefore, the increase rate of the water of the rain may fluctuate.

The determination means of the rain detection system distinguishes the water of the rainfall from condensation by taking above-described behaviors of the water of the rain without using additional device for exclusively detecting condensation of water vapor on the windshield. That is, when the increase rate of the water in the wiping cycle is greater than a predetermined positive number.

The rain detection system includes a mode selection means that determines an operation mode of the wiper system based on the detected amount of water. The determination means overrides the operation mode determined by the mode selection means when the mode selection means selects a fastest operation mode under a circumstance that condensation is detected by the determination means.

The control signal from the rain detection system to the wiper system may be sent directly to the wiper system. However, the control signal chosen by the mode selection means to operate the wiper system is not necessarily appropriate under a certain circumstance, i.e., visibility through the windshield is disturbed by condensation.

The rain detection system of the present invention prevents the mode selection means from selecting a fastest operation mode by recognizing condensation by using the determination means to avoid imposing discomfort on a driver of the vehicle.

The rain detection system shifts the operation mode determined by the mode selection means when condensation is recognized. That is, the operation mode of the wiper system shifts one level to a slower mode when condensation is detected. In this manner, the rain detection system serves as a proper assistance for driving without imposing discomfort on the driver.

The rain detection system determines the windshield condition as condensation with reserved cancellation of determination based on a subsequent detection. That is, the determination means changes the windshield condition from condensation to the rain in a later wiping cycle. The rain such as drizzling may be recognized as condensation especially at the beginning of the rain because of a size and density of the waterdrop. Therefore, the rain detection system of the present invention avoids false detection of condensation by changing the detected condition from the condensation to the rain. The rain detection system does not retain the false detection of condensation after changing it to the rain.

The rain detection system includes a comparison means to compare the amount of water in a predetermined period. The calculation means and the determination means are not used when unchanging or decreasing trend of the amount of the water is detected by the comparison means.

In this manner, the detection of water and determination are iterated in a predetermined interval in one wiping cycle. The comparison means saves determination process of condensation by using a simple process of comparison.

The rain detection system includes a washing operation recognition means to recognize that the windshield is having a washing fluid by receiving a washing signal. The determination means stops operation when the washing operation recognition means receives the washing signal.

The driver of the vehicle may wash the windshield whenever the driver feels that visibility through the windshield is disturbed. The rain detection system copes with this situation by overriding the control signal from the determination means upon receiving the washing signal. In this manner, the rain detection system properly serves as a driving assistance, and avoids discomfort for the driver of the vehicle.

The rain detection system includes a light source for providing a light that is projected toward an object for detection, and a light detector for receiving the light that is reflected by the object. The light reception device further outputs a detection signal being proportionally valued to the received light. The rain detection system detects the water on the windshield appropriately in this manner.

BRIEF DESCRIPTION OF THE DRAWINGS

Other objects, features and advantages of the present invention will become more apparent from the following detailed description made with reference to the accompanying drawings, in which:

FIG. 6A shows a first cross-sectional view of a waterdrop before landing on a windshield;

FIG. 6B shows a second cross-sectional view of the waterdrop on the windshield;

FIG. 6C shows a third cross-sectional view of the waterdrop on the windshield;

FIG. 7A shows a first cross-sectional view of condensation on the windshield;

FIG. 7B shows a second cross-sectional view of condensation on the windshield;

FIG. 7C shows a third cross-sectional view of condensation on the windshield;

DETAILED DESCRIPTION OF THE PREFERRED EMBODIMENTS

A rain detection system used for automatically controlling a wiper system is illustrated in the following description of an embodiment with reference to the drawings.

Figure 1:
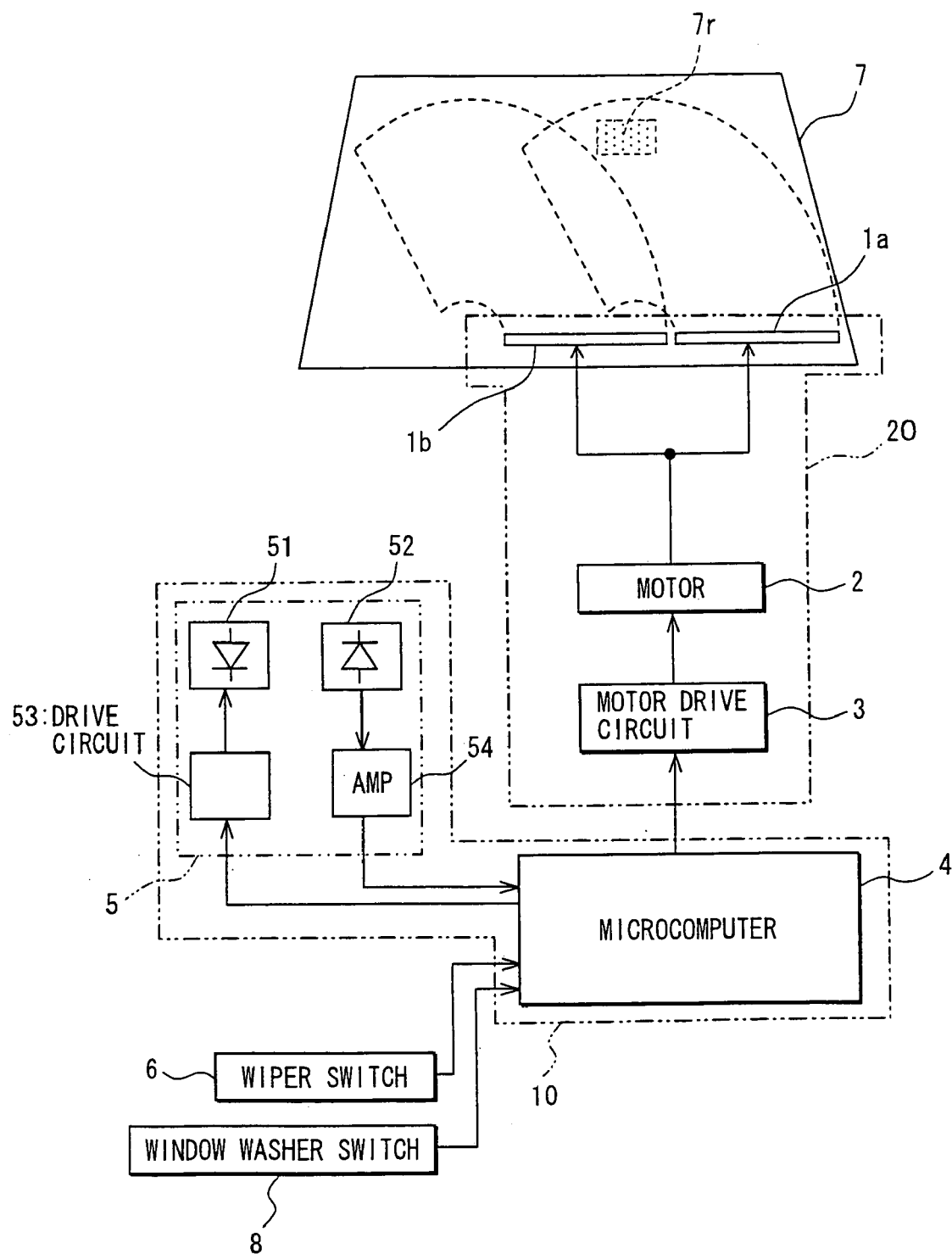
FIG. 1 shows a schematic diagram of a rain detection system in an embodiment of the present invention.
Figure 2:
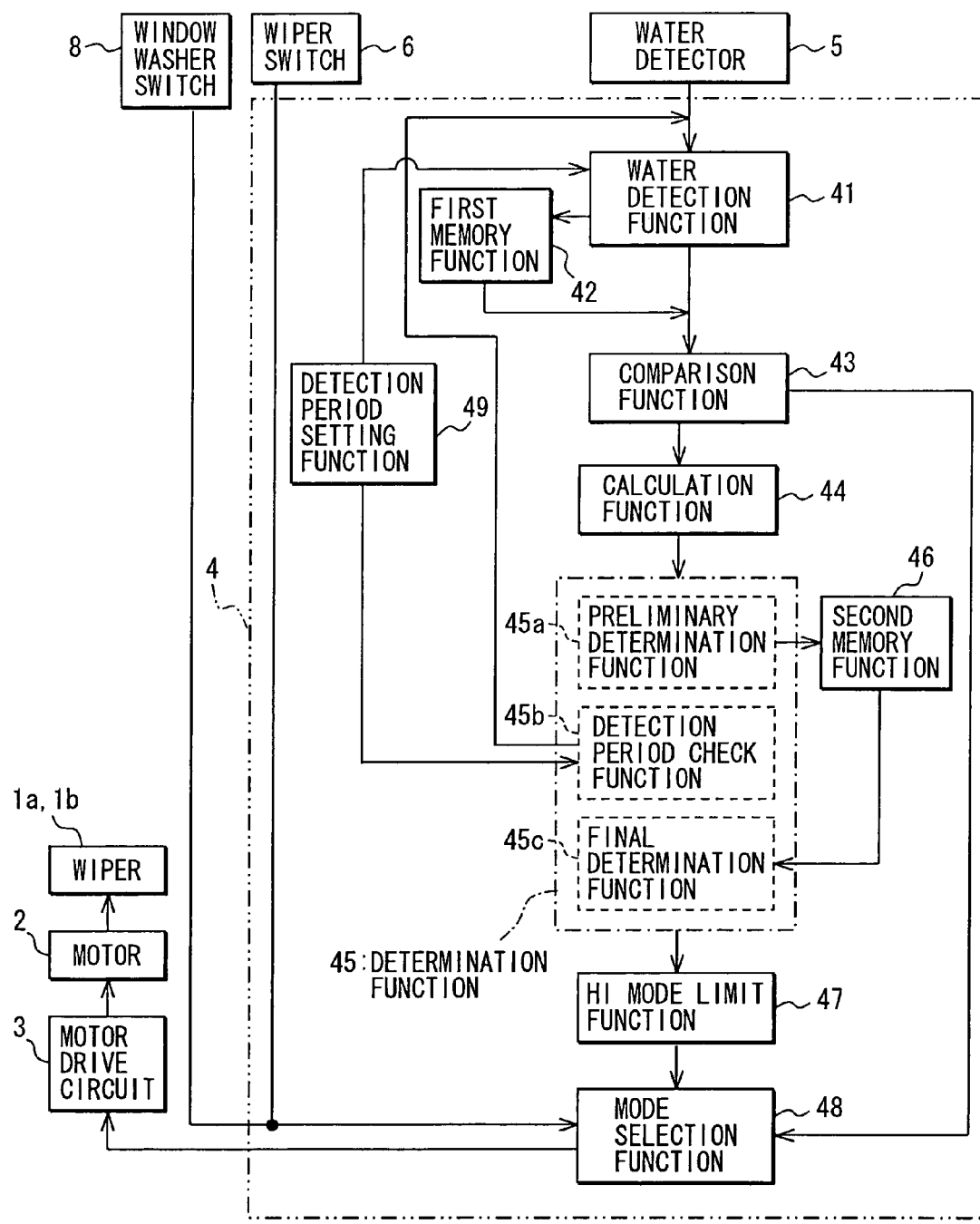
FIG. 2 shows a block diagram of functions in the rain detection system.
Figure 8B:
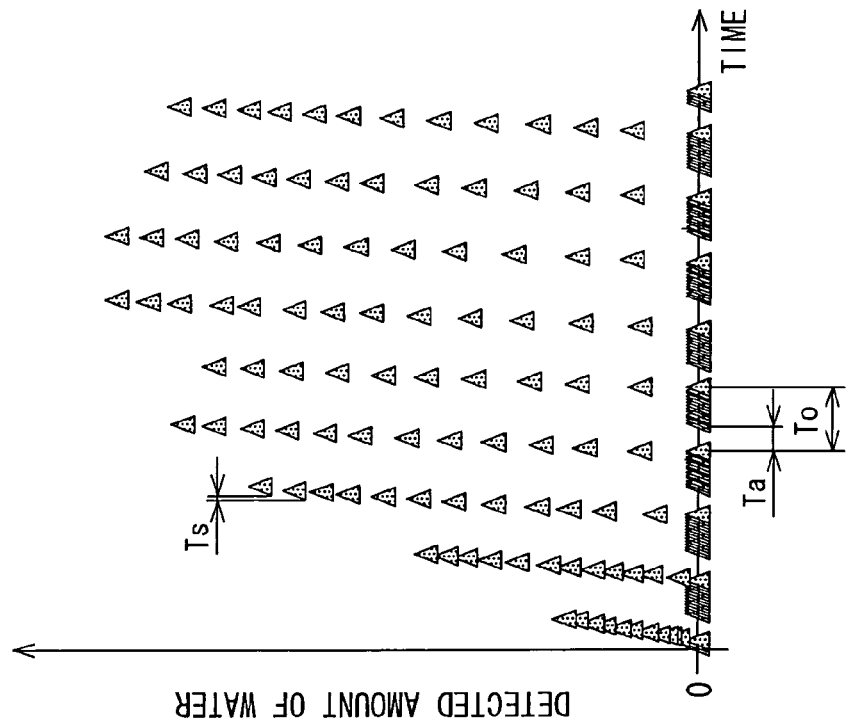
FIG. 8B shows the diagram illustrating the amount of the water detected by a conventional rain detection system.
Figure 8A:
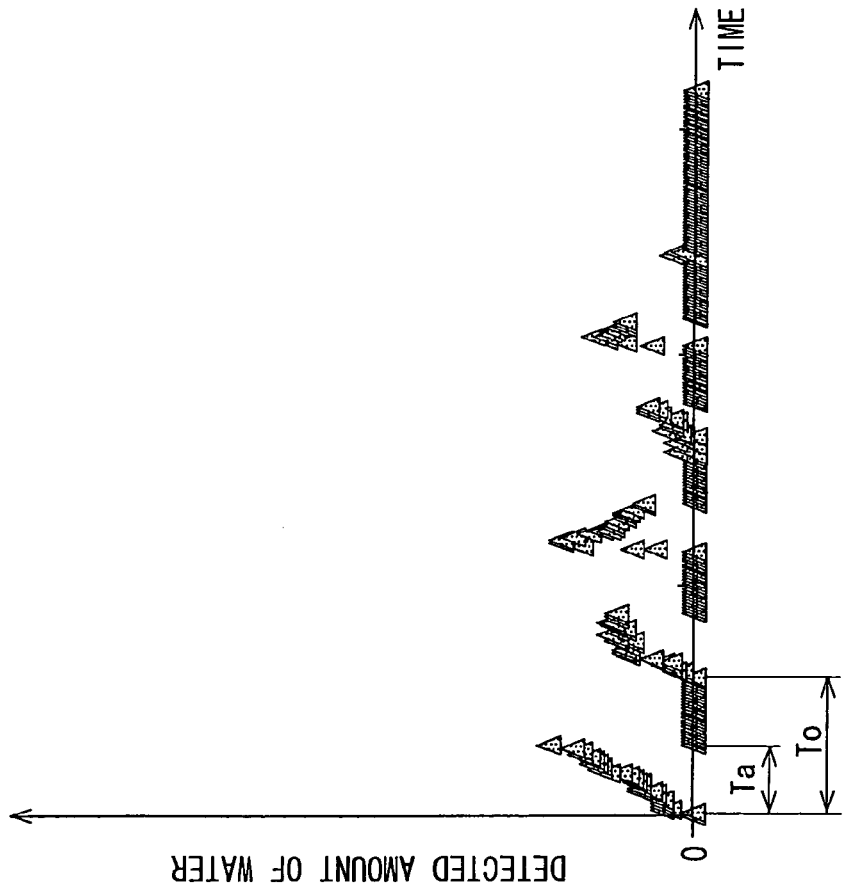
FIG. 8A shows a diagram illustrating an amount of water detected by the rain detection system of the present invention.

FIG. 1 shows a schematic diagram of the rain detection system 10 used as a part of a wiper system in the present embodiment. FIG. 2 shows a block diagram that illustrates functions used in a microcomputer 4 in FIG. 1. FIGS. 6A to 6C show drawings of a raindrop taken as cross-sectional views when the raindrop lands on a windshield 7. FIGS. 7A to 7C show drawings of condensation taken as cross-sectional views when water vapor in an atmosphere condenses and accumulates on the windshield 7. FIGS. 6A to 6C and 7A to 7C are arranged in an order of time-series. FIGS. 8A and 8B show diagrams of an amount of water detected on the windshield 7. The diagram in FIG. 8A shows the detected amount of the water from rain, and the diagram in FIG. 8B shows the detected amount of the water from condensation that is formed of vapor in an atmosphere.

A wiper system includes the rain detection system 10 and a wiping mechanism 20 as shown in FIG. 1. The rain detection system 10 detects an object such as water or the like on the windshield 7. The windshield 7 may be a front windshield or a rear windshield. The windshield 7 in the present embodiment is the front windshield. The wiping mechanism 20 is used to operate wipers 1a, 1b disposed on the windshield 7 to wipe the water on the windshield 7.

The wiping mechanism 20 includes a motor 2 for operating the wipers 1a, 1b in plural levels of speeds according to an operation mode and a motor drive circuit 3. The wipers 1a, 1b have wiper blades on the windshield 7. The wiper blades slidably wipe a surface of the windshield 7. The wipers 1a, 1b are driven by the motor 2 through a link mechanism not shown in the figure.

The motor drive circuit 3 receives a drive signal from the microcomputer 4, an external signal from a wiper switch 6 through the microcomputer 4 and other signal from the other devices. The motor drive circuit 3 controls the motor 2 by providing an electric power to it based on those signals. The wipers 1a, 1b slidably wipe the surface of the windshield 7 in a fan-shape area shown in FIG. 1 by a pivoting movement or the like.

The wiper switch 6 controls operation modes of the wipers 1a, 1b. That is, the wipers 1a, 1b operate in an OFF mode, an AUTO mode, a LOW mode and a HI mode when the wiper switch 6 switches the operation mode. The OFF mode stops operation of the wiping mechanism 20, the LOW mode operates the wiping mechanism 20 slowly, the HI mode operates the wiping mechanism 20 fast, and the AUTO mode automatically controls the operation mode, i.e., speed of wiping operation, under an instruction of the microcomputer 4. The wiper switch 6 sends a control signal that determines one of the four operation modes to the microcomputer 4 or to the motor drive circuit 3. The control signal is sent to the microcomputer 4 in the present embodiment.

The rain detection system 10 includes a water detector 5 and the microcomputer 4. The water detector 5 includes a light emitting element 51 such as an light emitting diode (LED) that emits an infrared light or the like and a light receiving element 52 such as a photo diode (PD) that receives the infrared light or the like for optically detecting water. The LED 51 and the PD 52 are coupled to construct the water detector 5. The water detector 5 is shown as a single pair of diodes in FIG. 1. However, plural pairs of the diodes may be used to detect the water. The amount of the water on the windshield 7 may be more precisely detected by using plural pairs of diodes. The water detector 5 in the present embodiment is regarded as a single pair of diodes, i.e., a pair of the LED 51 and the PD 52.

The LED 51 is coupled with an LED drive circuit 53. The microcomputer 4 controls the LED 51 through the LED drive circuit 53. That is, the LED 51 is turned on and off under the instruction of the microcomputer 4. The PD 52 is coupled with a wave detector/amplifier 54. The PD 52 outputs a detection signal to the microcomputer 4 through the wave detector/amplifier 54. The detection signal is used for transferring information on the amount of the water. The LED 51 and the LED drive circuit 53 are used to emit a light and the PD 52 and the wave detector/amplifier 54 are used to receive the light. The light is emitted from the LED 51 toward a detection area 7r on the windshield 7. Reflection of the light is received by the PD 52. The detection signal that represents the amount of the water on the windshield 7 is output from the PD 52 through the wave detector/amplifier 54.

The water detector 5 has a prism of well-known type (not shown in the figure) to collect the light from the LED 51 on an inner surface of the windshield 7 in the detection area 7r. The prism may include a heater, a heater circuit and a temperature sensor not shown in the figure to prevent condensation.

The water detector 5 detects the amount of the water in the detection area 7r on the windshield 7 wiped by the wipers 1a, 1b.

The microcomputer 4 includes a CPU, a memory device such as a ROM, RAM or the like, an input circuit, an output circuit, a power circuit and other well-known type circuits.

The microcomputer 4 receives signals such as the detection signal from the water detector 5, the external signal from the wiper switch 6 and other signals such as a wash signal from a window washer switch 8 or the like.

The microcomputer 4 determines the operation mode of the wiper system when it receives the control signal that specifies the AUTO mode from the wiper switch 6. The operation mode of the wiper system is chosen based on a calculation result of a control program stored in the memory device. The control program uses the detection signal from the water detector 5 for calculation that determines the operation mode. The microcomputer 4 operates the wipers 1a, 1b by outputting the drive signal to the motor drive circuit 3 based on the determined operation mode.

The window washer switch 8 is used to spray a washing fluid onto the windshield 7 when disturbance of visibility through the windshield 7 is recognized by the driver. The microcomputer 4 sprays the washing fluid when the window washer switch 8 is used.

An automatic mode selection for the wiping mechanism 20 having condensation recognition function is executed in the microcomputer 4 in the following manner by using the control program stored in the memory device. That is, functions arranged in the block diagram in FIG. 2 play each portion of a role. The functions include a water detection function 41, a comparison function 43, a calculation function 44, a determination function 45, a HI mode limit function 47, a mode selection function 48 and a detection period setting function 49.

The water detection function 41 detects the amount of the water based on the detection signal from the water detector 5 in a predetermined sampling interval. The sampling interval Ts (shown in FIGS. 8A and 8B) is substantially shorter than the wiping cycle To of the wipers 1a, 1b. In this case, plural sampling intervals Ts (50 milliseconds) are taken in one wiping cycle To.

The sampling interval Ts is further defined by a detection period Ta. That is, the detection period Ta is defined as a period of time during which the wipers 1a, 1b wipes an area outside the detection area 7r in all operation modes, and the sampling interval Ts can be taken plural times in one detection period Ta.

The detection period setting function 49 determines the detection period Ta based on the wiping cycle To in effect when the water detection function 41 is executed. The detection period Ta is determined by taking into account a position of the wipers 1a, 1b calculated from a power condition of the motor drive circuit 3, a rotation angle of the motor 2 and the like.

Default values of the sampling interval Ts and the detection period Ta are, for example, determined as 50 milliseconds and 3 seconds respectively by the detection period setting function 49. In this manner, the water detection function 41 uses those values at the beginning of the rain for calculation of the amount of the water.

A first memory function 42 stores values of the amount of the water detected by the water detection function 41 in the sampling interval Ts for comparison.

The comparison function 43 compares two subsequent detected amounts of the water in the sampling interval Ts. The comparison function 43 determines whether a trend of the detected amount of the water is either unchanging, decreasing or otherwise.

The comparison function 43 determines the condition of the windshield 7 as 'rain' when the trend is either unchanging or decreasing. In this case, the calculation function 44, the determination function 45 and the HI mode selection function 48 are skipped, and the mode selection function 48 is executed. The calculation function 44, the determination function 45 and the HI mode limit function 47 are not skipped when the trend is determined as increasing.

The calculation function 44 calculates the increase rate of the amount of the water based on the detection signal. The determination function 45 includes preliminary determination function 45a, a detection period check function 45b and a final determination function 45c for determining a condition of the windshield 7. The preliminary determination function 45a determines whether the condition of the windshield 7 is 'condensation' based on the increase rate.

The increase rate greater than 5% is regarded as condensation in the present embodiment, and the increase rate equal to or smaller than 5% is determined as rain. The result of determination is stored in a second memory function 46 as a 'condensation OFF' state for a record of not detecting condensation on the windshield 7 when the increase rate is equal to or smaller than 5%.

The inventor confirmed by an experiment that the amount of water by condensation on a windshield constantly increases as shown in a diagram in FIG. 8B during the wiping cycle To (Wiper operation: HI mode). That is, the amount of the water shows an increasing trend (an accumulation pattern) in each of the wiping cycle To. The mechanism of the increasing trend is shown in FIGS. 7A to 7C. Condensed drop-shape waters 9b are relatively small on the windshield 7, and the condensed drop-shape waters 9b are allowed to increase in number until they fill an entire surface of the detection area 7r of the windshield 7.

The inventor also confirmed that the amount of the water by the rain, i.e., a raindrop 9a, fluctuatingly changes because of the surface tension of the raindrop or the like as shown in FIGS. 6A to 6C. That is, the raindrop 9a spreads when it lands on the windshield 7 (FIG. 6B), and the raindrop 9a forms a spherical shape because of the surface tension (FIG. 6C).

The raindrop 9a is generally greater in size than the condensed drop-shape water 9b. Therefore, the raindrops 9a may form a larger mass of water to fall down along the surface of the windshield 7.

The condition of windshield 7 determined as 'rain' is shown on the diagram in FIG. 8A (Wiper operation: INT mode). The trend of the detected amount of the water increases at the beginning of the rain, and the trend alters to unchanging or decreasing afterwards. As a result, the water detector 5 may detect decreased amount of the water.

The inventor determines that an appropriate threshold of the increase rate is 5% based on the above-described conditions. This value is confirmed by checking conditions ranging from drizzling to a heavy rain with a diversified humidity.

The determination function 45 includes the detection period check function 45b and the final determination function 45c as described before. The detection period check function 45b determines whether the detection period Ta has finished. The water detection function 41 is iteratively executed as shown in FIG. 2 while the detection period Ta is remaining.

The preliminary determination function 45a in the wiping cycle To is regarded as concluded when the detection period Ta is determined as finished. The final determination function 45c determines whether the 'condensation OFF' state is recorded in the second memory function 46. The condition of the windshield 7 is determined as 'condensation' when no 'condensation OFF' state is found in the memory device.

The condition of the windshield 7 is determined as 'rain' when the 'condensation OFF' state is found.

The HI mode limit function 47 outputs a limit signal to the mode selection function 48 to control the motor drive circuit 3 when the condition of the windshield 7 is determined as 'condensation.' In this manner, the HI mode operation is prohibited.

The mode selection function 48 selects the operation mode based on the detection signal from the water detector 5 that represents the amount of the water and the limit signal from the HI mode limit function 47 that prohibits an operation in the HI mode. The limit signal is used when condensation is detected. The microcomputer 4 outputs the operation mode selected by the mode selection function 48 as the drive signal to the motor drive circuit 3.

Figure 3:
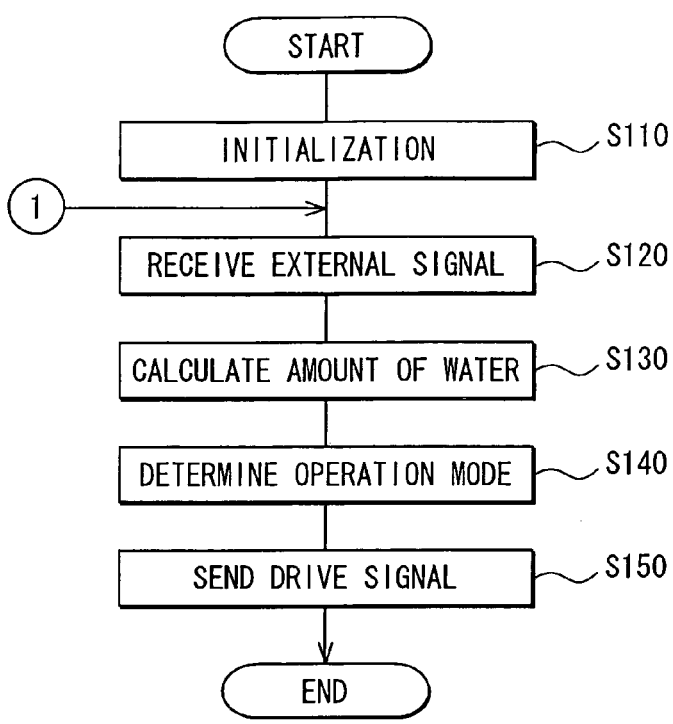
FIG. 3 shows a flowchart of a main process of the rain detection system.
Figure 4:
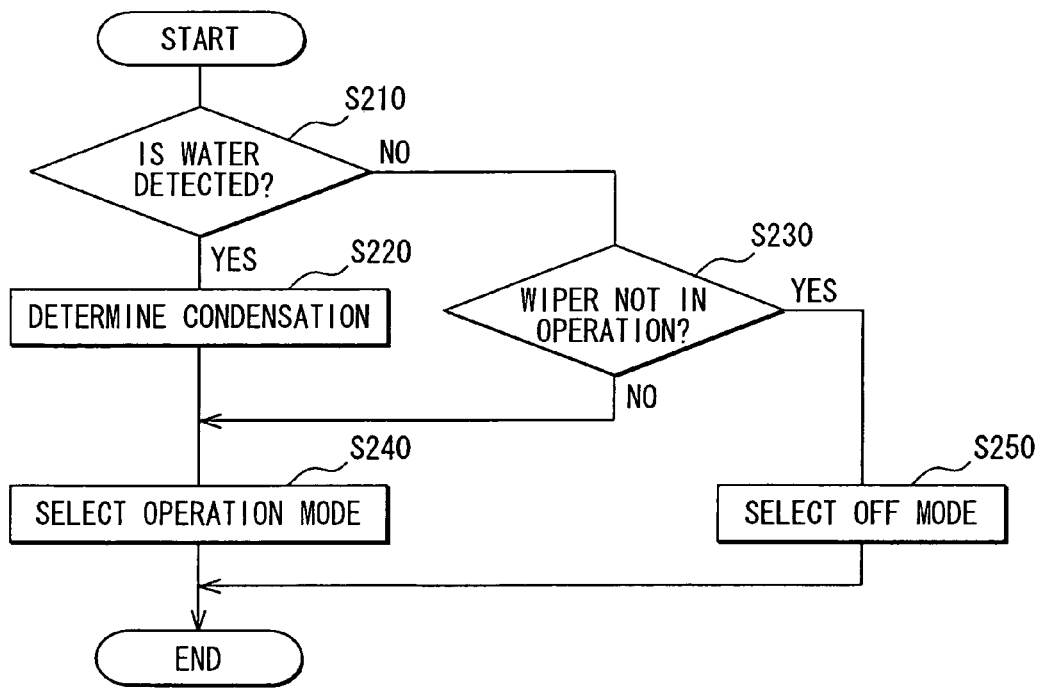
FIG. 4 shows a flowchart of an operation mode determination process.
Figure 5:
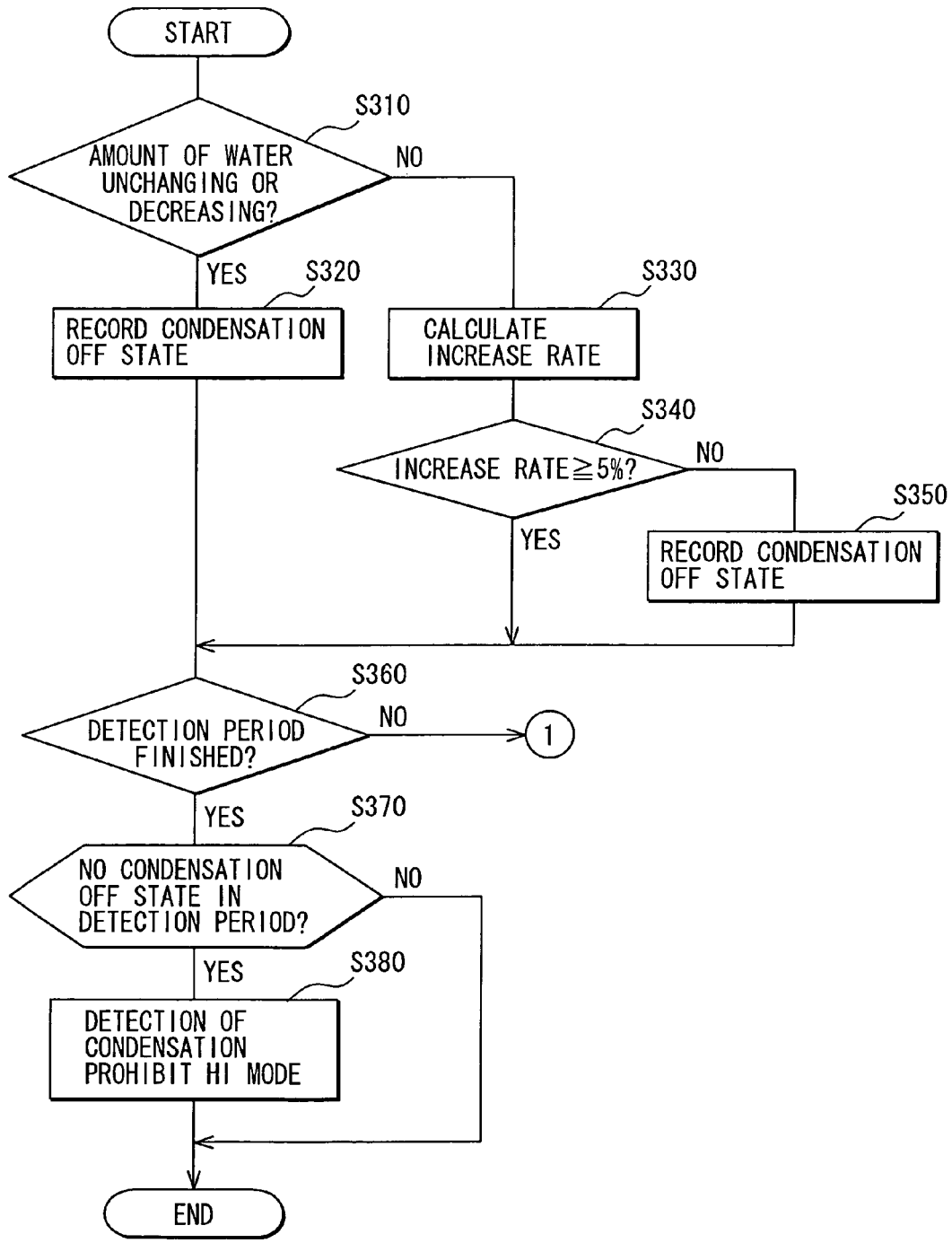
FIG. 5 shows a flowchart of a condensation detection process.

The automatic mode selection for the wiping mechanism 20 having condensation recognition function executed in the microcomputer 4 is explained with reference to flowcharts shown in FIGS. 3 to 5. FIG. 3 shows a flowchart of a main process of the automatic mode selection. FIG. 4 shows a flowchart of an operation mode determination process. FIG. 5 shows a flowchart of a condensation recognition process.

The main process of the automatic mode selection in the microcomputer 4 starts with an initialization in step S110 as shown in FIG. 3. Then, the process receives the external signal from the wiper switch 6 in step S120. The external signal in this embodiment operates the wiping mechanism 20 in the AUTO mode.

The main process receives the detection signal in step S130 from the water detector 5 in the predetermined interval of 50 milliseconds for calculating the amount of water on the windshield 7. The main process determines the operation mode in step S140 based on the detected amount of the water. The main process sends the drive signal in step S150 to the motor drive circuit 3 to operate the wipers 1a, 1b in the determined operation mode. The main process concludes in step S150.

The operation mode determination process in step S140 is further explained with reference to the flowchart in FIG. 4. The determination process starts with detection of the water on the windshield 7 based on the detection signal from the water detector 5 in step S210. The determination process proceeds to step S220 when the water is detected. The determination process proceeds to step S230 when the water is not detected.

The determination process determines whether condensation is formed on the windshield 7 in step S220. The determination process concludes in step S240 by determining the operation mode based on a result of water detection and a result of condensation recognition process.

The determination process determines whether the wipers 1a, 1b are not operating in step S230. The determination process sets the operation mode to the OFF mode in step S250 when the wipers 1a, 1b are not operating. The determination process proceeds to step S240 when the wipers 1a, 1b are operating.

The condensation recognition process in step S220 is further explained with reference to FIG. 5. The recognition process compares the amount of water detected in a last sampling with the amount detected in a current sampling conducted in the interval of 50 milliseconds. The recognition process proceeds to step S320 when the amount of water is substantially unchanging or decreasing. The recognition process stores the 'condensation OFF' state in the memory device in step S320 to proceed to step S360. The recognition process proceeds to step S330 when the amount of the water is increasing.

The recognition process calculates the increase rate of the amount of water in step S330 based on a comparison described above before proceeding to step S340. The recognition process determines whether the increase rate is greater than 5% in step S340. The recognition process proceeds to step S360 when the increase rate is either equal to or greater than 5%. The recognition process proceeds to step S350 when the increase rate is smaller than 5%. The recognition process stores the 'condensation OFF' state in the memory device in step S350 to proceed to step S360.

The recognition process determines in step S360 whether the detection period has finished. The recognition process proceeds to step S370 when the detection period has finished. The recognition, process proceeds to step S120 when the detection period is remaining. The main process keeps returning to step S120 until the detection period finishes if the recognition process proceeds from step S360 to step S120.

The recognition process determines in step S370 whether the 'condensation OFF' state is recorded in the detection period. The recognition process proceeds to step S380 and determines that the water on the windshield 7 is formed by condensation if the 'condensation OFF' state is not recorded. The recognition process recognizes that condensation is on the windshield 7 and prohibits HI mode operation to conclude the recognition process.

The determination process in step S240 selects an operation mode other than the HI mode when the recognition process prohibits HI mode because of condensation. The determination process in step S240 selects an operation mode without any prohibition when the 'condensation OFF' state is recorded.

The processes of the automatic mode selection are explained based on an assumption that the AUTO mode is being selected in the present embodiment. The mode selection function 48 selects the drive signal to the motor drive circuit 3 based on the driver's selection of the operation mode when the mode selection is different from the AUTO mode. That is, the drive signal to the drive circuit 3 drives the wipers 1a, 1b in the LO mode when the driver selects the LO mode by using the wiper switch 6.

The microcomputer 4 preferably skips the determination function 45 when it receives the wash signal from the window washer switch 8. The determination function 45 is skipped because it may mistake the washing fluid sprayed over the windshield 7 for condensation.

With regard to the effect of the present invention, the operation mode of the rain detection system is explained with reference to FIGS. 8A and 8B.

The rain detection system of the present invention determines the condition of the windshield 7 shown in the diagram in FIG. 8A as 'rain' as the conventional rain detection system does. Therefore, the wiper system operates in the intermittent mode to suitably maintain visibility of the windshield 7 under the instruction of the microcomputer 4.

A conventional rain detection system determines the condition of the windshield 7 shown in the diagram in FIG. 8B as 'heavy rain' based on the detected amount of water. Therefore, the conventional rain detection system operates the wiper system in the high speed mode. However, the rain detection system of the present invention determines the condition of the windshield 7 as 'condensation' based on the increase rate of the detected amount of the water. Therefore, rain detection system of the present invention operates the wiper system in the low speed mode or the like without needlessly increasing the operation speed of the wiper system. In this manner, the rain detection system of the present invention preferably prevents the wiper system from imposing discomfort on the driver.

The diagram in FIG. 8B typically shows that the increase rate of the detected amount of the water may make the rain detection system of the present invention determine the condition of the windshield 7 as 'condensation.' That is, the increase rate constantly surpassing 5% may be taken as absence of a larger mass of water seen in the heavy rain in spite of a greater value of the detected amount of the water based on the comparison of, for example, the diagram in FIG. 8A and the diagram in FIG. 8B. In other words, the increase rate represented as an inclination angle of a line between the two subsequent detection points in the diagram in FIG. 8B may always be greater than a predetermined value when the windshield 7 is exposed to a mist or the like instead of rain.

Although the present invention has been fully described in connection with the preferred embodiments thereof with reference to the accompanying drawings, it is to be noted that various changes and modifications will become apparent to those skilled in the art.

For example, the water detector 5 uses the infrared light for detecting the water. However, the detector 5 may use other type of light for detecting the water. Further, the detector 5 may be another type of optical detector that detects the water.

The HI mode limit function 47 prohibits HI mode operation in automatic mode selection process when the determination function 45 detects condensation on the windshield 7. However, the HI mode operation may be shifted to a slower operation mode such as the LO mode. A shift to the slower operation mode may ease discomfort of the driver by avoiding an unnecessarily frequent wiping for securing visibility.

A method of processing the detection signal and the increase rate and used to distinguish 'condensation' on the window from 'rain' may vary according to a situation, a climate or the like.

Such changes and modifications are to be understood as being within the scope of the present invention as defined by the appended claims.

What is claimed is:

1. An operation signal generator for generating and outputting an operation signal to operate a wiping system on a window comprising:

a detection means for detecting an amount of watery liquid in a form of droplets on the window in a period of a wiping cycle;

a calculation means for calculating an increase rate of the amount of the watery liquid in the form of droplets detected in a detection operation by the detection means;

a determination means for determining a window condition based on the increase rate calculated by the calculation means, wherein the determination means determines the window condition as condensation when the increase rate in the period of the wiping cycle is greater than a predetermined value; and a mode selection means for selecting an operation mode of the wiping system, wherein a fastest operation mode in the mode selection means is overridden when the determination means determines the window condition as condensation.

2. The operation signal generator of claim 1,
wherein the fastest operation mode in the mode selection means is changed to a slower operation mode when the determination means determines the window condition as condensation.

3. The operation signal generator of claim 1 further comprising:
a washing condition recognition means for recognizing the window condition as being washed by a washing fluid,
wherein the determination means stops determining the window condition when the washing condition recognition means recognizes the window condition as being washed.

4. The operation signal generator of claim 1, the detection means further comprising:
a light emitting element for emitting a light to detect an object including the watery liquid in the form of droplets; and
a light reception element for receiving a light redirected from the object and outputting a signal indicative of an amount of the light received thereby.

5. An operation signal generator for generating and outputting an operation signal to operate a wiping system on a window comprising:
a detection means for detecting an amount of watery liquid in a form of droplets on the window in a period of a wiping cycle;
a calculation means for calculating an increase rate of the amount of the watery liquid in the form of droplets detected in a detection operation by the detection means;
a determination means for determining a window condition based on the increase rate calculated by the calculation means;
wherein the determination means determines the window condition as condensation when the increase rate in the period of the wiping cycle is greater than a predetermined value; and
the determination means overrides the window condition determined as condensation when the determination means determines the window condition as being different from condensation in a subsequent period of the wiping cycle based on the increase rate.

6. An operation signal generator for generating and outputting an operation signal to operate a wiping system on a window comprising:
a detection means for detecting an amount of watery liquid in a form of droplets on the window in a period of a wiping cycle;
a calculation means for calculating an increase rate of the amount of the watery liquid in the form of droplets detected in a detection operation by the detection means;
a determination means for determining a window condition based on the increase rate calculated by the calculation means; and
a comparison means for comparing the amount of the watery liquid in the form of droplets in the period of the wiping cycle,
wherein the calculation means stops calculating the increase rate when the comparison means determines the amount of the watery liquid in the form of droplets as at least not increasing in the wiping cycle.

7. A method for detecting an accumulation pattern of liquid droplets comprising:
using a detection function for detecting an amount of the liquid droplets on a window in a period of time;
using a calculation function for calculating an increase rate of the amount of the liquid droplets on the window detected by using the detection function;
using a determination function for determining a window condition based on the increase rate of the amount of the liquid droplets calculated by the calculation function; and
using a comparison function for comparing the amount of the liquid droplets,
wherein the step of using the calculation function is skipped when the amount of the liquid droplets compared by the step of using the comparison function is not substantially increasing over the period of the time.

8. The method of claim 7,
wherein the detection method distinguishes the accumulation pattern of the liquid droplets by condensation from the accumulation pattern of the liquid droplets by rain.

9. A method of operating a wiping system on a window, the method comprising:
detecting an amount of watery liquid in a form of droplets on the window in a period of a wiping cycle;
calculating an increase rate of the detected amount of the watery liquid in the form of droplets;
determining a window condition based on the calculated increase rate, the window condition being determined as condensation when the calculated increase rate in the period of the wiping cycle is greater than a predetermined value; and
selecting an operation mode of the wiping system;
wherein a fastest operation mode as a selection as the operation mode is overridden when the window condition is determined as condensation.

10. The method of claim 9,
wherein the fastest operation mode is changed to a slower operation mode when the window condition is determined as condensation.

11. A method of operating a wiping system on a window, the method comprising:
detecting an amount of watery liquid in a form of droplets on the window in a period of a wiping cycle;
calculating an increase rate of the detected amount of the watery liquid in the form of droplets; and
determining a window condition based on the calculated increase rate, the window condition being determined as condensation when the calculated increase rate in the period of the wiping cycle is greater than a predetermined value;
wherein the window condition being determined as condensation is overridden when the window condition is determined as being different from condensation in a subsequent period of the wiping cycle based on the calculated increase rate.

* * * * *